United States Patent
Asbery et al.

(10) Patent No.: US 12,427,627 B2
(45) Date of Patent: Sep. 30, 2025

(54) POWERED PUMP UNITS FOR VACUUM CUPS, POWERED VACUUM CUP DEVICES, AND METHODS FOR APPLYING A VACUUM TO A VACUUM CUP

(71) Applicant: Equalizer Industries, Inc., Round Rock, TX (US)

(72) Inventors: Eric Asbery, Round Rock, TX (US); Shauna Davis, Round Rock, TX (US)

(73) Assignee: Equalizer Industries, Inc., Round Rock, TX (US)

( * ) Notice: Subject to any disclaimer, the term of this patent is extended or adjusted under 35 U.S.C. 154(b) by 932 days.

(21) Appl. No.: 17/576,762

(22) Filed: Jan. 14, 2022

(65) Prior Publication Data
US 2022/0228585 A1   Jul. 21, 2022

Related U.S. Application Data

(60) Provisional application No. 63/138,436, filed on Jan. 16, 2021.

(51) Int. Cl.
*B25B 11/00*    (2006.01)
*F04B 35/04*    (2006.01)
(Continued)

(52) U.S. Cl.
CPC ............ *B25B 11/007* (2013.01); *F04B 35/04* (2013.01); *F04B 39/121* (2013.01);
(Continued)

(58) Field of Classification Search
CPC ........ F04B 35/04; F04B 37/14; B65G 49/061; B65G 2249/045; B25B 11/007
See application file for complete search history.

(56) References Cited

U.S. PATENT DOCUMENTS 3,240,525 A  *  3/1966  Wood .................. B65G 49/061
                                              294/185
5,007,899 A      4/1991  Larsson
(Continued)

FOREIGN PATENT DOCUMENTS

CN         2806399 Y       8/2006
DE        20121892 U1      9/2003
(Continued)

OTHER PUBLICATIONS

International Search Report and Written Opinion issued Mar. 29, 2022, in PCT/US2022/012648.

*Primary Examiner* — Eldon T Brockman
(74) *Attorney, Agent, or Firm* — Calvert Technology Law, PLLC; Nathan H. Calvert

(57) ABSTRACT

A powered pump unit is adapted to operate with a vacuum cup device having a pump cylinder for a manually operated vacuum pump. The powered pump unit includes a pump unit housing, a power source receiver, a vacuum pump, a pump drive, and a sealing arrangement. The pump unit housing is adapted to be received in the pump cylinder in an operating position after the piston is removed from the pump cylinder. The power source receiver, vacuum pump, and pump drive are each mounted on the pump unit housing and at least one of them is at least partially located in the pump cylinder when the pump unit housing is in the operating position. The pump drive is operatively connected to drive the vacuum pump to produce a vacuum that is applied to the vacuum cup of the vacuum cup device.

20 Claims, 14 Drawing Sheets

(51) Int. Cl.
   *F04B 39/12*   (2006.01)
   *B65G 49/06*   (2006.01)
(52) U.S. Cl.
   CPC .......... *F04B 39/123* (2013.01); *B65G 49/061* (2013.01); *B65G 2249/045* (2013.01)

(56)                References Cited

U.S. PATENT DOCUMENTS

| | | | |
|---|---|---|---|
| 5,795,001 A * | 8/1998 | Burke | B65G 49/061 |
| | | | 294/185 |
| 7,628,434 B2 | 12/2009 | Bruce et al. | |
| 7,673,914 B2 * | 3/2010 | Liao | F16B 47/00 |
| | | | 294/185 |
| 9,669,442 B1 | 6/2017 | Alvarez | |
| 12,115,659 B1 * | 10/2024 | Nguyen | F16B 47/00 |
| 2005/0015098 A1 * | 1/2005 | Vines | A61B 17/442 |
| | | | 606/123 |
| 2009/0166490 A1 | 7/2009 | Liao | |
| 2017/0165733 A1 | 6/2017 | Alvarez | |
| 2022/0331993 A1 * | 10/2022 | Nguyen | F16B 47/00 |

FOREIGN PATENT DOCUMENTS

| | | |
|---|---|---|
| DE | 10049089 B4 | 10/2005 |
| DE | 202006016226 U1 | 12/2006 |

* cited by examiner

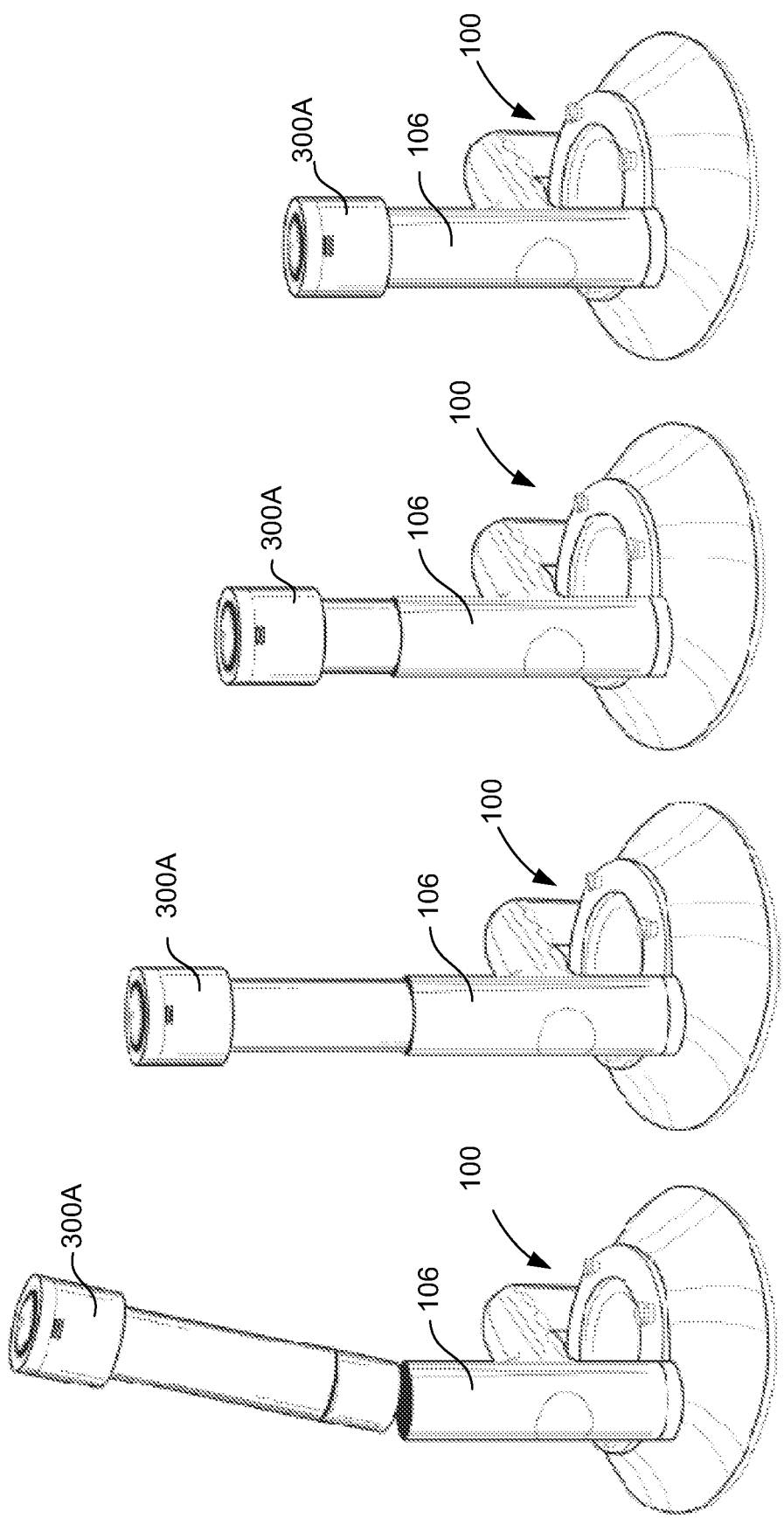

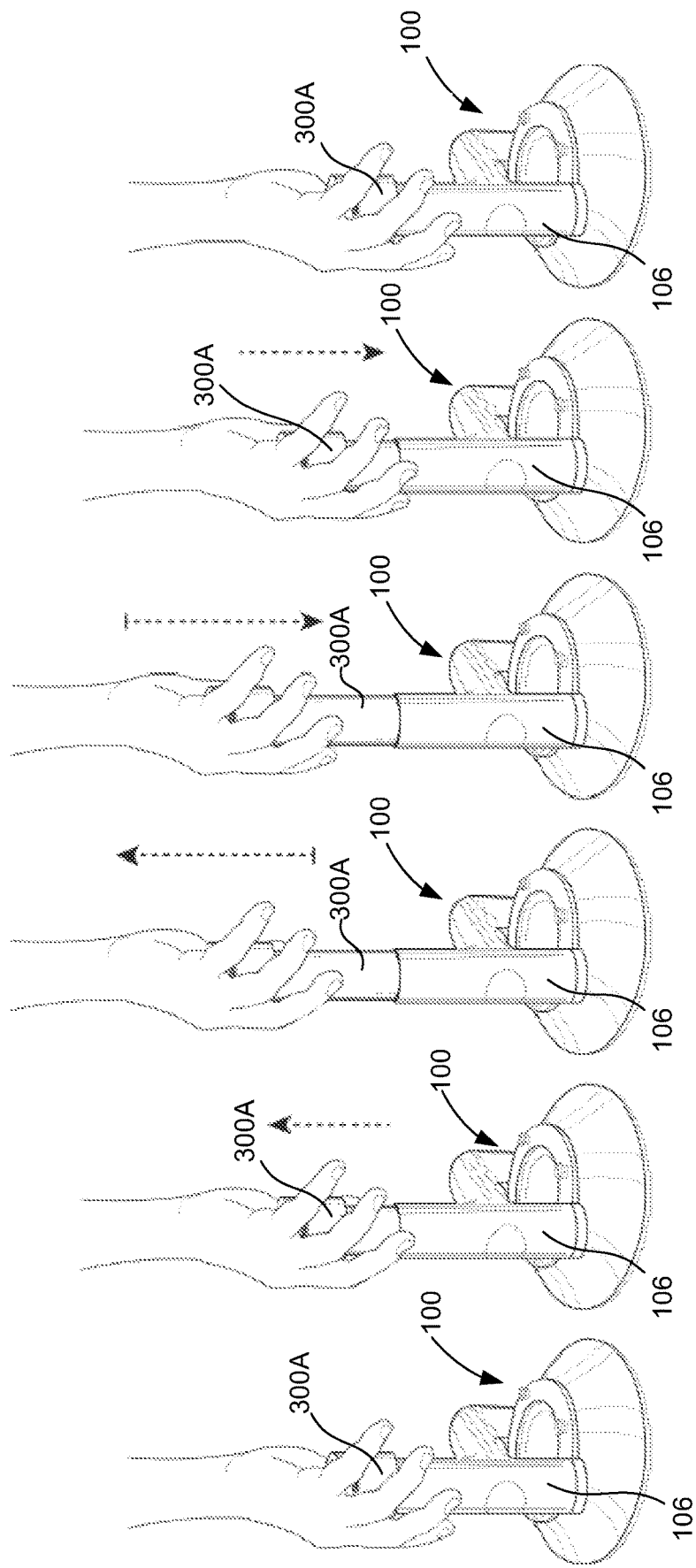

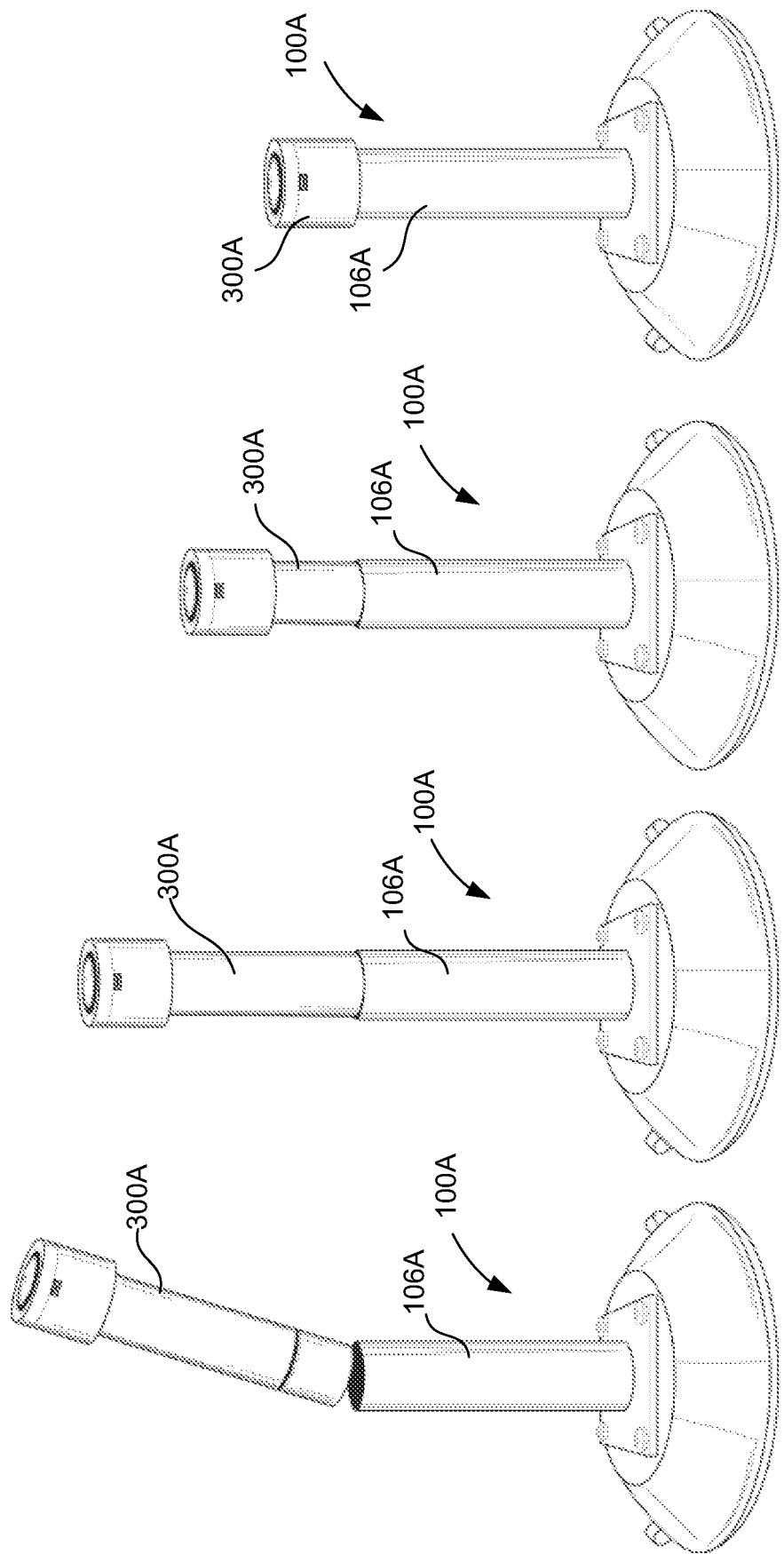

POWERED PUMP UNITS FOR VACUUM CUPS, POWERED VACUUM CUP DEVICES, AND METHODS FOR APPLYING A VACUUM TO A VACUUM CUP

CROSS-REFERENCE TO RELATED APPLICATION

Applicant claims the benefit, under 35 U.S.C. § 119(e), of U.S. Provisional Patent Application No. 63/138,436 filed Jan. 16, 2021, and entitled "Powered Pump Units for Vacuum Cups." The entire content of this provisional application is incorporated herein by this reference.

TECHNICAL FIELD OF THE INVENTION

The invention relates to vacuum cups, particularly vacuum cups used for lifting objects having a relatively flat, nonpermeable surface such as glass including auto glass, and countertop materials. More particularly, the invention relates to a powered pump unit for converting a manually pumped vacuum cup device to a powered vacuum cup device. The invention also relates to vacuum cup devices which have been converted to powered vacuum cup devices by the addition of a powered pump unit and to methods for applying a vacuum in a vacuum cup device.

BACKGROUND OF THE INVENTION

Hand-held vacuum cups are commonly used to allow a technician to conveniently grasp and manipulate large flat sheets of material such as sheets of glass. Such vacuum cups are used in particular by auto glass technicians in the installation and removal of auto glass such as windshields for example. Hand-held vacuum cups, such as the device 100 shown for example in FIG. 1, commonly include cup part 101 and a base 102. The base 102 supports a handle 103 and a vacuum pump 104 and also provides a connecting structure for the cup part 101. The cup part 101 is formed from resilient and flexible material with a concave surface facing away from the handle to which the cup part is connected. The vacuum pump 104 in the example device 100 includes a cylinder 106 that is incorporated into the handle 103 so that the user may conveniently press a plunger 105 of the vacuum pump while grasping the handle 103. As shown in the example of FIG. 2, the plunger 105 may be included in a plunger and piston assembly 200 that includes a plunger carrier 202 and a piston 204 connected to the plunger 105 through a linkage contained in the plunger carrier 202. In the example of FIGS. 1 and 2, the plunger and piston assembly 200 is inserted into the cylinder 106 to the position shown in FIG. 1 and then the user may press and release the plunger 105 multiple times to reciprocate the piston 204 in the cylinder 106 and pull a vacuum on the volume defined by the concave surface of the cup part 101 against a surface (not shown in FIG. 2).

Battery powered hand-held vacuum cups have become popular in the auto glass industry for several reasons, including their ability to maintain suction to the cup part continuously during operation, even when the user releases the vacuum cup device to perform other operations in the installation or removal of a piece of glass. This popularity is in spite of the additional cost of a battery powered vacuum cup to replace a manually operated vacuum cup the user may already have and in spite of the fact that prior battery powered vacuum cups were bulkier and somewhat more awkward to handle than manually operated vacuum cups. Despite the popularity of battery powered vacuum cups, many auto glass technicians continue to own and use manually operated vacuum cups.

SUMMARY OF THE INVENTION

It is an object of the invention to provide powered pump units for use with vacuum cup devices designed for pumping with a manually operated vacuum pump. Other objects of the invention are to provide powered vacuum cup devices having a manual pump cylinder and methods for applying a vacuum to the vacuum cup of a vacuum cup device.

A powered pump unit according to one aspect of the present invention is operable with a vacuum cup device having manually operated vacuum pump. In particular, a powered pump unit according to this first aspect of the present invention is adapted to operate with vacuum cup device having a pump cylinder for a manually operated vacuum pump where the pump cylinder is adapted to removably receive a manually operated piston that is removeable to expose the pump cylinder. A powered pump unit according to this aspect of the invention includes a pump unit housing, a power source receiver, a vacuum pump, a pump drive, and a sealing arrangement. The pump unit housing is adapted to be at least partially received in the pump cylinder in an operating position after the piston is removed from the pump cylinder. The power source receiver, vacuum pump, and pump drive are each mounted on the pump unit housing and at least one of them is at least partially located in the pump cylinder when the pump unit housing is in the operating position. The vacuum pump has a vacuum port and a discharge port, the vacuum port being open to a first portion of the pump cylinder when the pump unit housing is in the operating position. This first portion of the pump cylinder is in fluid communication with a cup volume of the vacuum cup device. The pump drive is operatively connected to drive the vacuum pump to produce a vacuum at the vacuum port in response to power applied through a power source when the power source is operatively received in the power source receiver and activated to apply power. The sealing arrangement is adapted to form a seal with the pump cylinder when the pump unit housing is in the operating position. This seal serves to isolate the first portion of the pump cylinder from a remainder of the pump cylinder.

A powered pump unit according to this first aspect of the invention may be used to replace the manually operated piston for which the vacuum cup device is adapted. This replacement converts the vacuum cup device to a powered device. This conversion ability allows a user to convert the manually operated vacuum cup devices they already own to powered devices without changing the essential configuration of the device. Thus the user need not purchase a complete powered vacuum cup device. Furthermore, since the user is already practiced at manipulating the vacuum cup device in its pre-conversion configuration, there is no need for the user to adapt to an entirely different vacuum cup device that may have a different configuration.

Another aspect of the present invention comprises a powered vacuum cup device that has been converted using a powered pump unit according to the first aspect of the invention. A vacuum cup device according to this second aspect of the invention includes a device body that defines the pump cylinder for a manually operated vacuum pump as described above. Beyond the device body, a vacuum cup device according to this aspect of the invention includes a pump unit housing, power source receiver, vacuum pump, pump drive, and sealing arrangement as described above in connection with a powered pump unit according to the first aspect of the invention. Vacuum cup devices according to this second aspect of the present invention allow manufacturers to offer both powered and manually operated vacuum cup devices using the same design for the cup, cup base, handle, and vacuum pump cylinder. This saves both on tooling costs and also allows users to select their desired configuration, powered or manually operated, in a common overall device configuration with which they may already be familiar.

A third aspect of the present invention encompasses methods for applying a vacuum to a vacuum cup of a vacuum cup device. The vacuum cup device here has a configuration as described above in connection with the first aspect of the invention. The vacuum cup device further includes a pump unit housing, power source receiver, vacuum pump, pump drive, and sealing arrangement as described above in connection with a powered pump unit according to the first aspect of the invention. Methods according to this third aspect of the invention include, with the manually operated piston removed from the pump cylinder, inserting the powered pump unit housing at least partially into the pump cylinder to an operating position for the powered pump unit. Methods according to this third aspect of the invention further include operating the pump drive to drive the vacuum pump to produce a vacuum at the vacuum port and applied to the cup volume of the vacuum cup from the pump cylinder.

These and other advantages and features of the invention and various aspects of the invention will be apparent from the following description of representative embodiments, considered along with the accompanying drawings.

BRIEF DESCRIPTION OF THE DRAWINGS

FIGS. 13-16 are a series of isometric views showing a powered pump unit according to an embodiment of the invention being inserted to an operating position in the pump cylinder of a prior art vacuum cup device.

FIGS. 17-22 are a series of isometric views showing a powered pump unit as shown in FIGS. 13-16 being operated to manually draw a vacuum on the vacuum cup of the prior art vacuum device shown in those figures.

FIGS. 23-26 are a series of isometric views showing the powered pump unit according to an embodiment of the invention being inserted to an operating position in the pump cylinder of a prior vacuum cup device.

DESCRIPTION OF REPRESENTATIVE EMBODIMENTS

Figure 1:
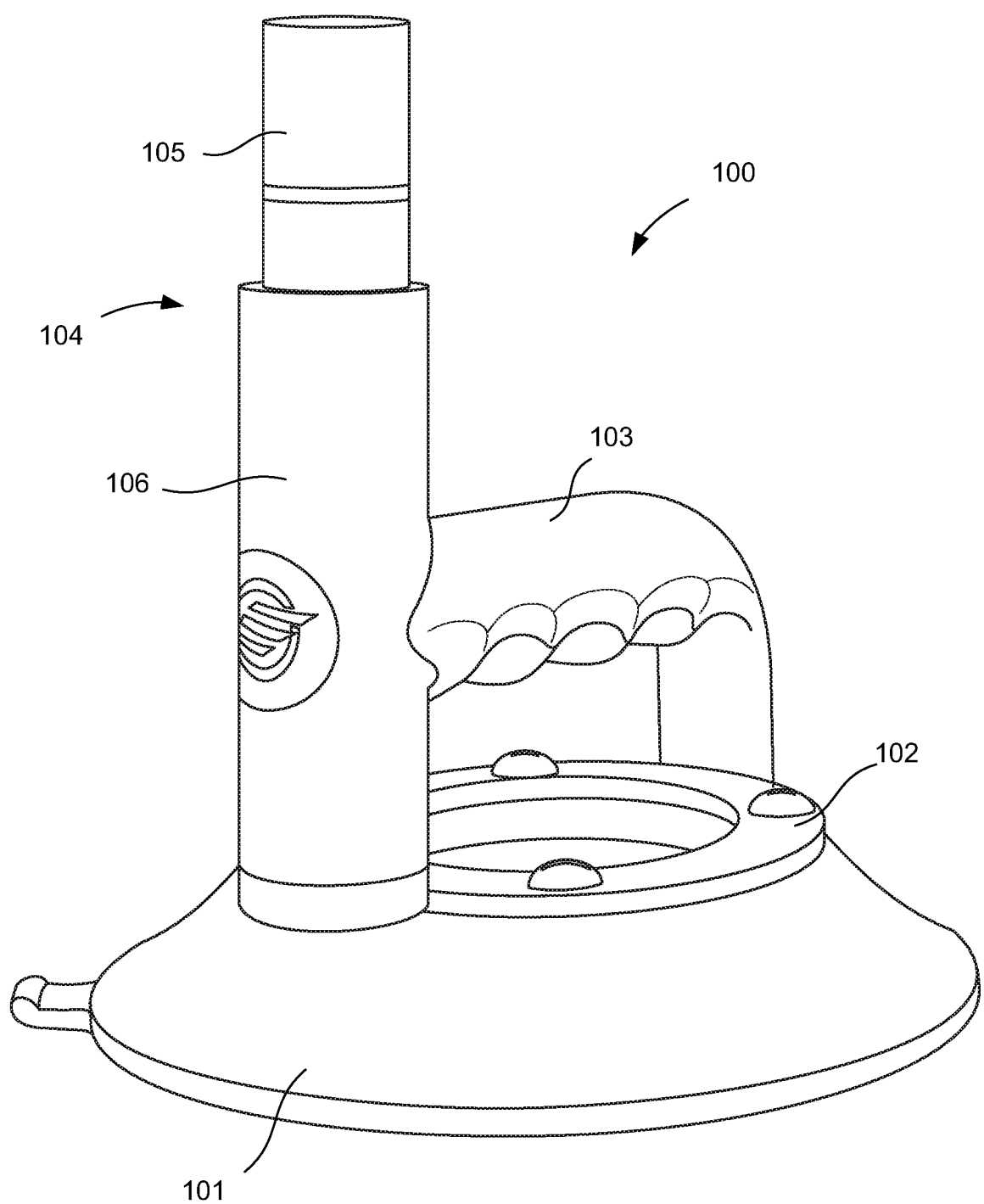
FIG. 1 is an isometric view of a prior art manually operated vacuum cup device that may receive a powered pump unit according to embodiments of the present invention.
Figure 3:
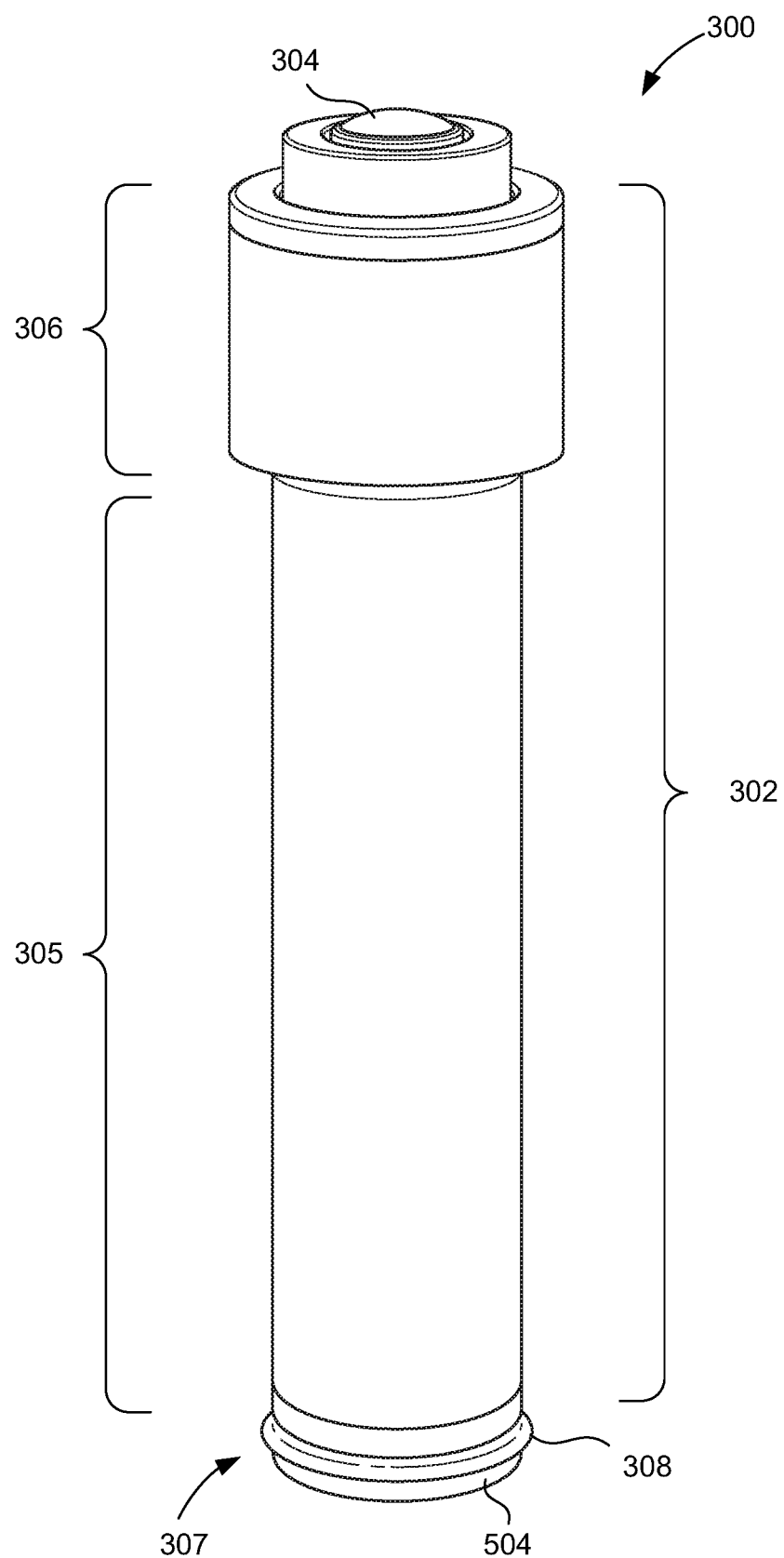
FIG. 3 is an isometric view of a powered pump unit according to an embodiment of the present invention.

A powered pump unit 300 according to an embodiment of the present invention shown in FIG. 3 is adapted to use with a vacuum cup device such as the example device 100 shown in FIG. 1 having a pump cylinder 106 for a manually operated vacuum pump with a piston 204 that is removeable from the pump cylinder 106. The illustrated powered pump unit 300 includes a pump unit housing 302 and a sealing arrangement 307 both shown in the view of FIG. 3, and a power source receiver 600, a vacuum pump 604, a pump drive 602 all shown in the schematic view of FIG. 6.

Figure 2:
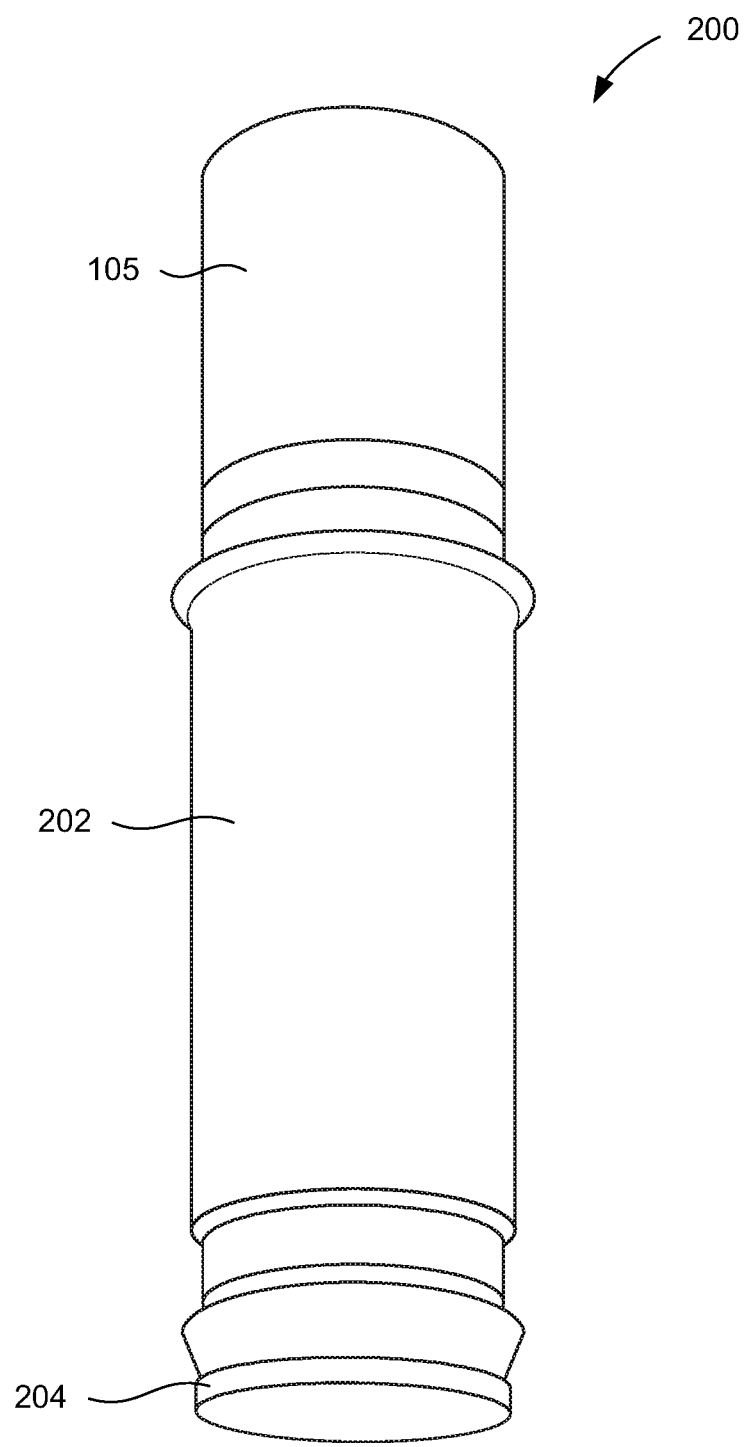
FIG. 2 is an isometric view of a prior art plunger/piston assembly for use in the manually operated vacuum cup device shown in FIG. 1.

The pump unit housing 302 is adapted to be at least partially received in the pump cylinder 106 in an operating position after the manually operated piston 204 is removed from the pump cylinder (by removing the plunger and piston assembly 200 in the example of FIGS. 1 and 2). By "pump cylinder" here and in the claims, it is meant the part of the prior art device in which the piston reciprocates and also any continuation of the cylinder such as the structure that contains the plunger carrier 202 in the example of FIG. 2. The sequence of FIGS. 13-16 shows a powered pump unit 300A in accordance with the present invention being inserted into the pump cylinder 106 of the example manually operated vacuum cup device 100. FIGS. 23-26 show a sequence in which the powered pump unit 300A in accordance with the present invention is inserted into an operating position in a pump cylinder 106A of an alternate manually operated vacuum cup device 100A.

Figure 6:
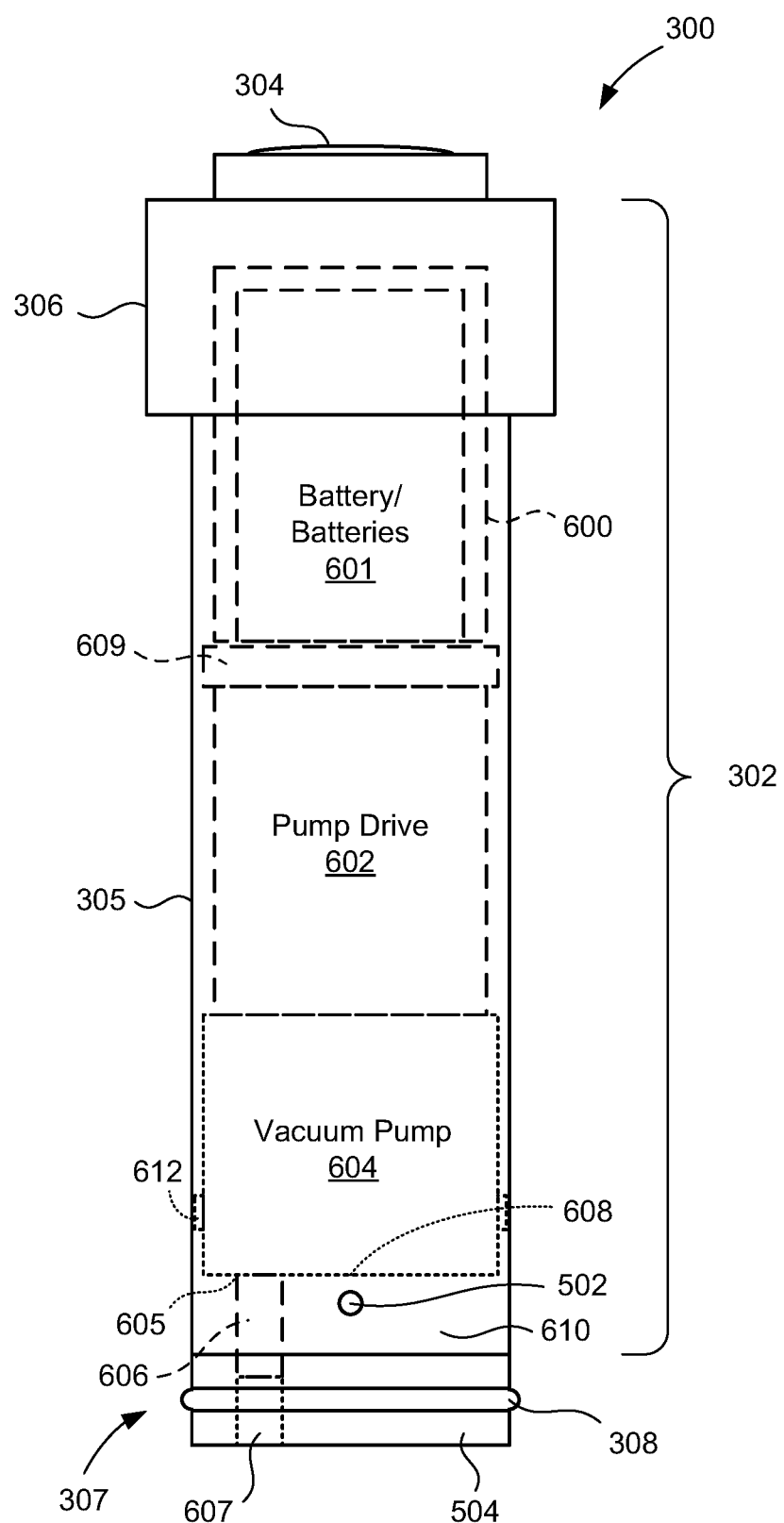
FIG. 6 is a schematic side elevation view of the powered pump unit of FIG. 3.
Figure 7:
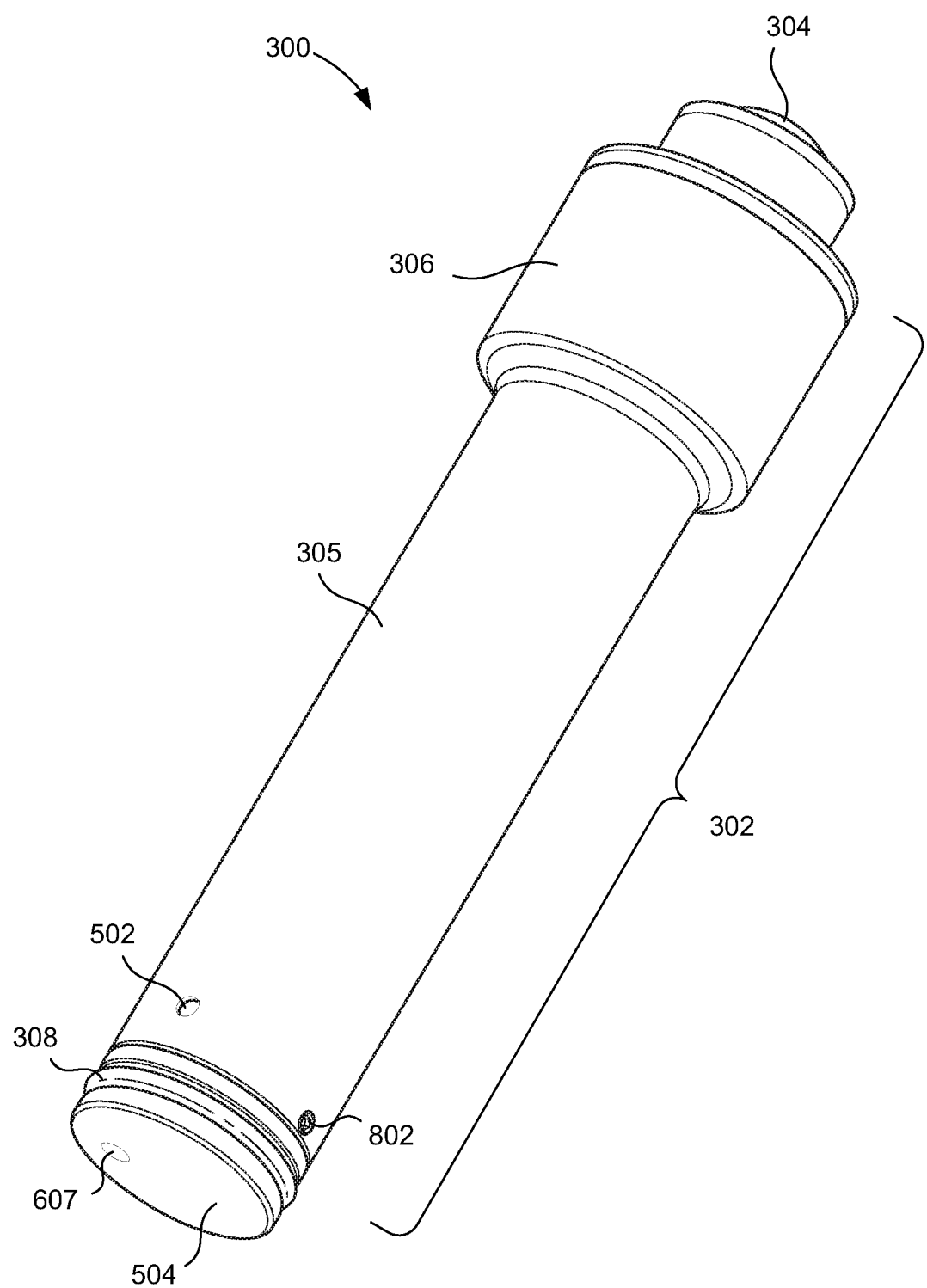
FIG. 7 is an isometric view of the powered pump unit of FIG. 3.
Figure 8:
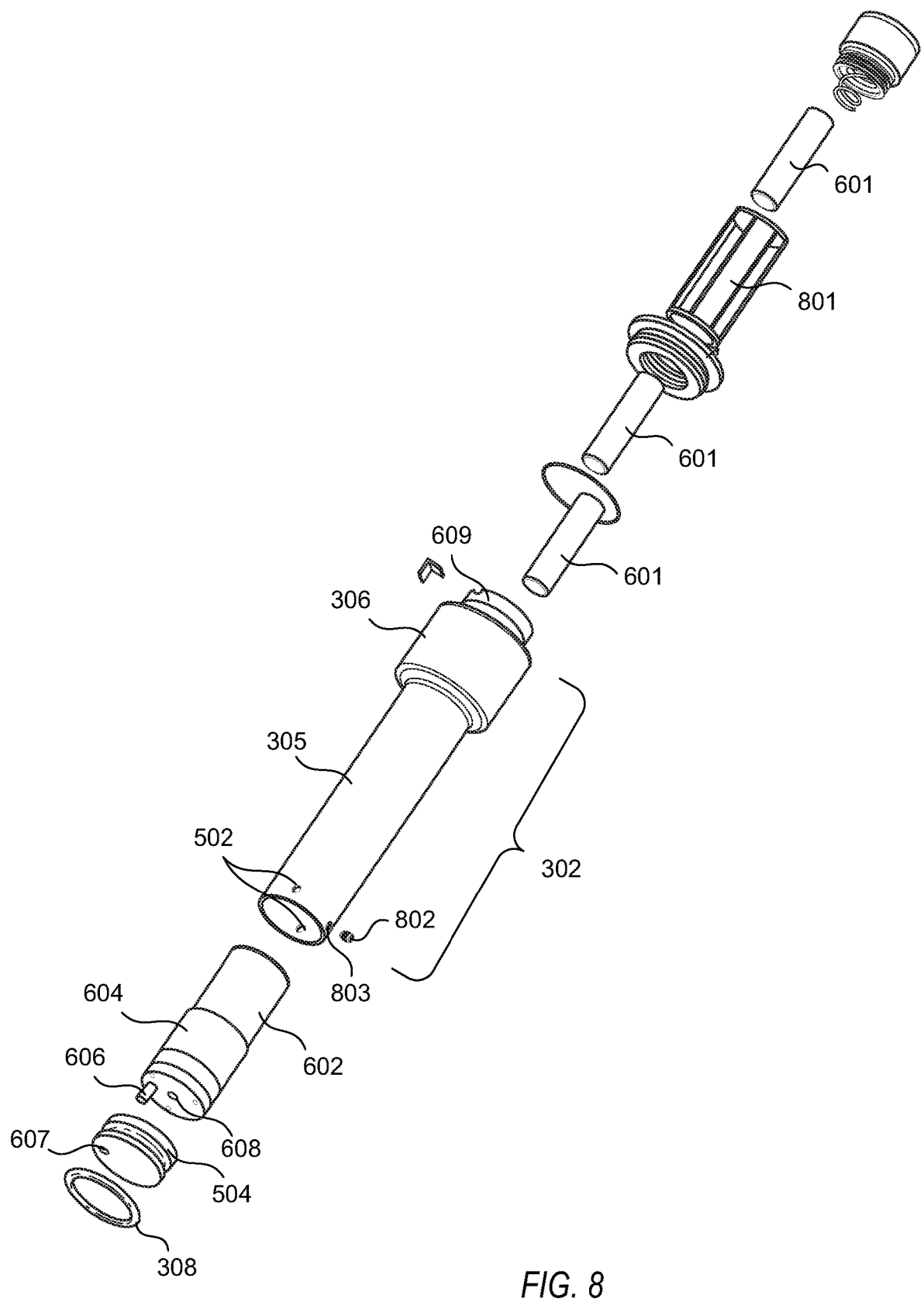
FIG. 8 is an exploded isometric view of the powered pump unit shown in FIG. 7.
Figure 9:
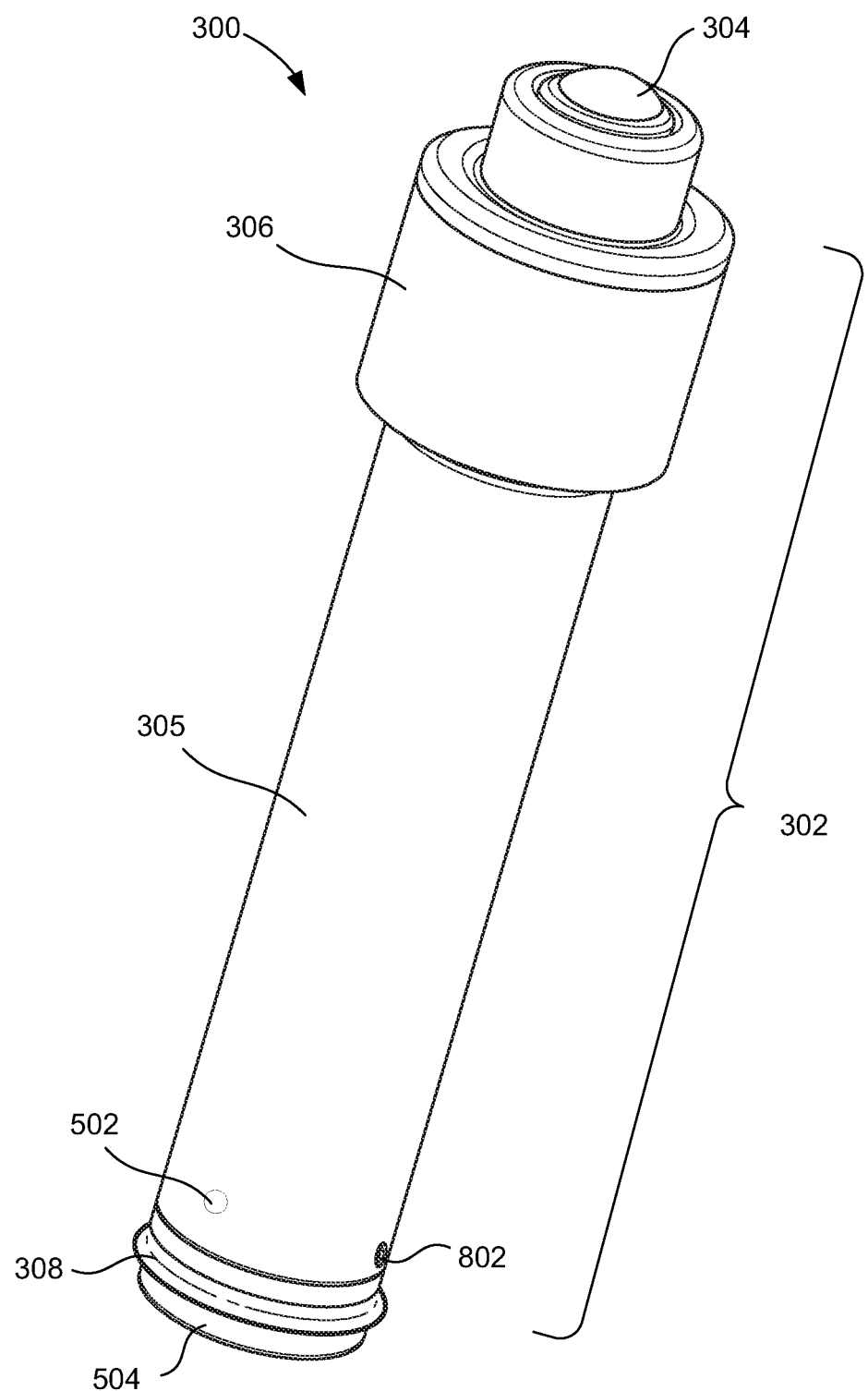
FIG. 9 is an isometric view of the embodiment shown in FIG. 7 from a different perspective.
Figure 10:
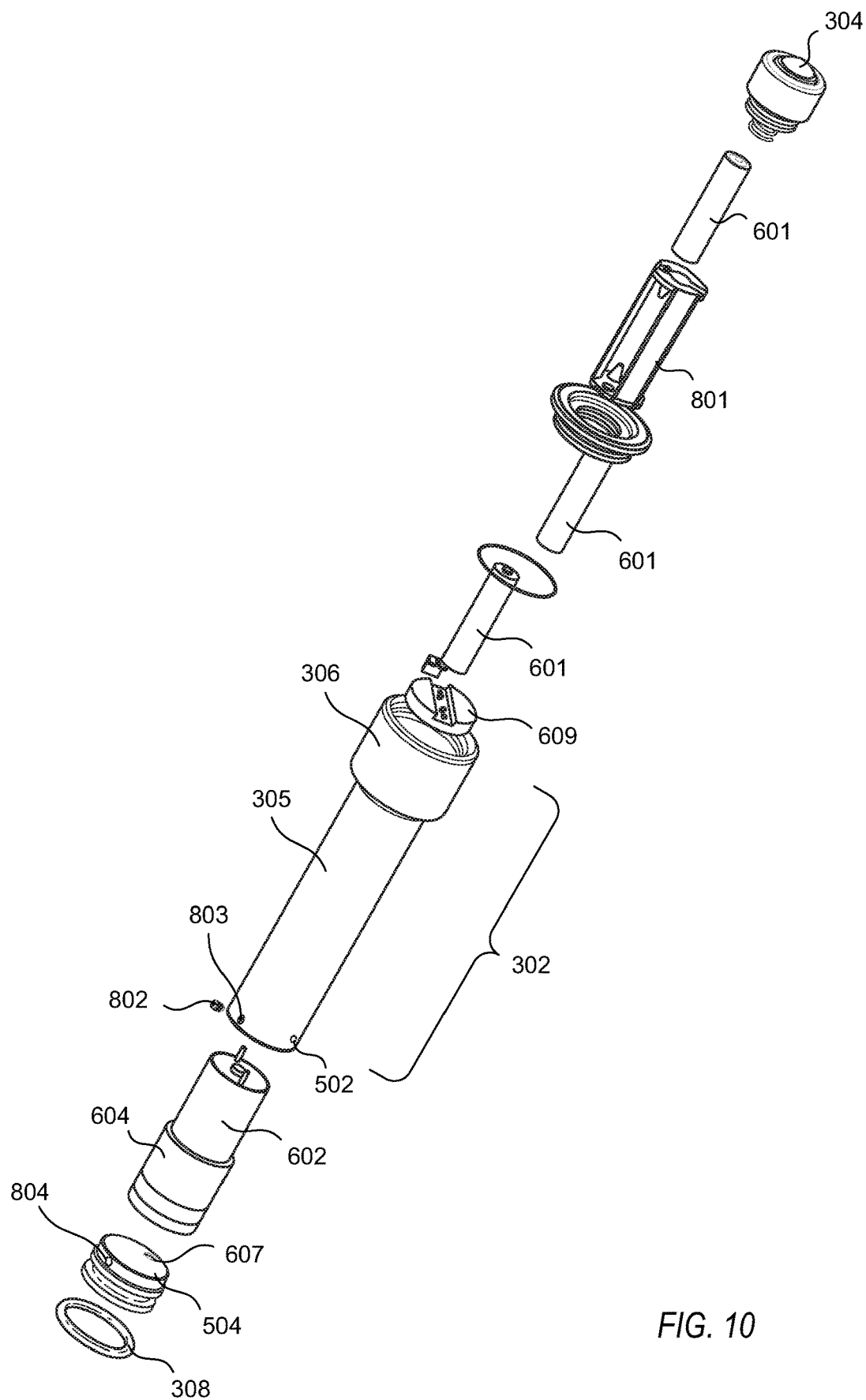
FIG. 10 is an exploded isometric view from the perspective of FIG. 9.
Figure 11:
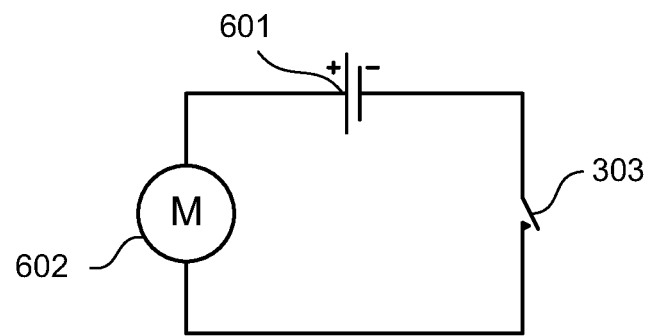
FIG. 11 is a circuit diagram of a powered pump unit according to a first embodiment of the present invention.
Figure 12:
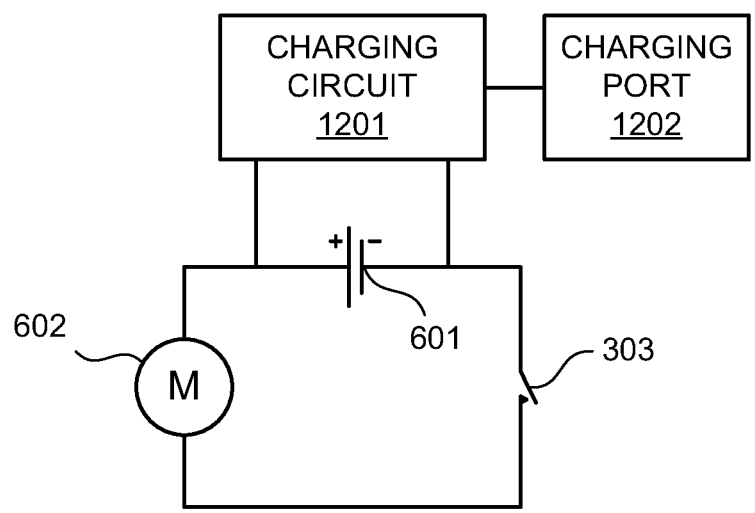
FIG. 12 is a circuit diagram of a powered pump unit according to a second embodiment of the present invention.

The power source receiver 600 shown schematically in FIG. 6 is located on the pump unit housing 302 and may comprise simply a volume in the pump unit housing 302 for receiving a power source such as one or more batteries 601. The power source receiver 600 may also include a battery carrier device 801 shown in the exploded views of FIGS. 8 and 10, adapted to hold a power source comprising a battery arrangement including more than one battery 601 (three batteries 601 in these examples). The arrangement of batteries 601 is mounted on/in the power source receiver 600 with leads of the battery arrangement operatively connected to, or connectable to, electrical contacts of the power source receiver. The example of FIG. 6 includes an electrical contact arrangement 609 which is also shown in the exploded views of FIGS. 8 and 10. The batteries 601 may include rechargeable batteries and the powered pump unit 300 may also include a battery charging circuit 1201 having a battery charging port 1202 as shown in FIG. 12. Such a battery charging port 1202 may comprise a micro USB or USB-C receiver connector for example, or any other type of connector which may be used to connect to a power source suitable for driving the battery recharging circuit to recharge the rechargeable battery. The remainder of the circuit shown in FIG. 12 includes the pump drive 602, batteries 601, and a switch 303 for selectively closing the circuit to operate the pump drive 602. Where the powered pump unit 300 uses non-rechargeable batteries 601 the electrical circuit may simply include the pump drive 602, one or more batteries 601, and switch 303 as shown in FIG. 11.

The vacuum pump 604 shown schematically in FIG. 6 is also mounted on the pump unit housing 302 and includes a vacuum port 605 and a discharge port 608. The vacuum port 605 is located so as to be open to a first portion of the pump cylinder 106 when the pump unit housing 302 is in the operating position. This first portion of the pump cylinder comprises a portion in fluid communication with a cup volume of the vacuum cup device 100 and in the example of FIG. 5 comprises the volume of pump cylinder 106 below (in the orientation of the figure) an O-ring sealing element 308 when the powered pump unit 304 is in the operating position shown in FIG. 5. The vacuum pump 604 may comprise any suitable device that may be driven by a suitable motor or drive to produce a vacuum to be applied to the vacuum cup of the device. The vacuum pump 604 may be a rotary vane-type pump for example, or any other suitable rotating or reciprocating vacuum pump.

The pump drive 602 shown schematically in FIG. 6 is also mounted on the pump unit housing 302 and operatively connected to drive the vacuum pump 604. When a suitable power is applied to the pump drive 602 through a power source operatively received in the power source receiver 600, the pump drive 602 drives the vacuum pump 604 to produce a vacuum at vacuum port 605. For example, the pump drive 602 may comprise a rotating DC motor. In this example, the operative connection to the vacuum pump 604 may be a connection, either direct or through suitable gearing, between a shaft (not shown) of the pump drive 602 and a shaft (not shown) of the vacuum pump 604. The power in this illustrated example is in the form or an electrical current applied from a battery or batteries 601.

Referring still particularly to FIG. 6, the sealing arrangement shown generally at 307 (and comprising O-ring 308 in this embodiment) is adapted to form a seal with the pump cylinder 106 when the pump unit housing 302 is in the operating position. This seal serves to isolate the first portion of the pump cylinder 106 from a remainder of the pump cylinder so that the vacuum generated by the vacuum pump 604 can be applied to the vacuum cup volume.

Figure 4:
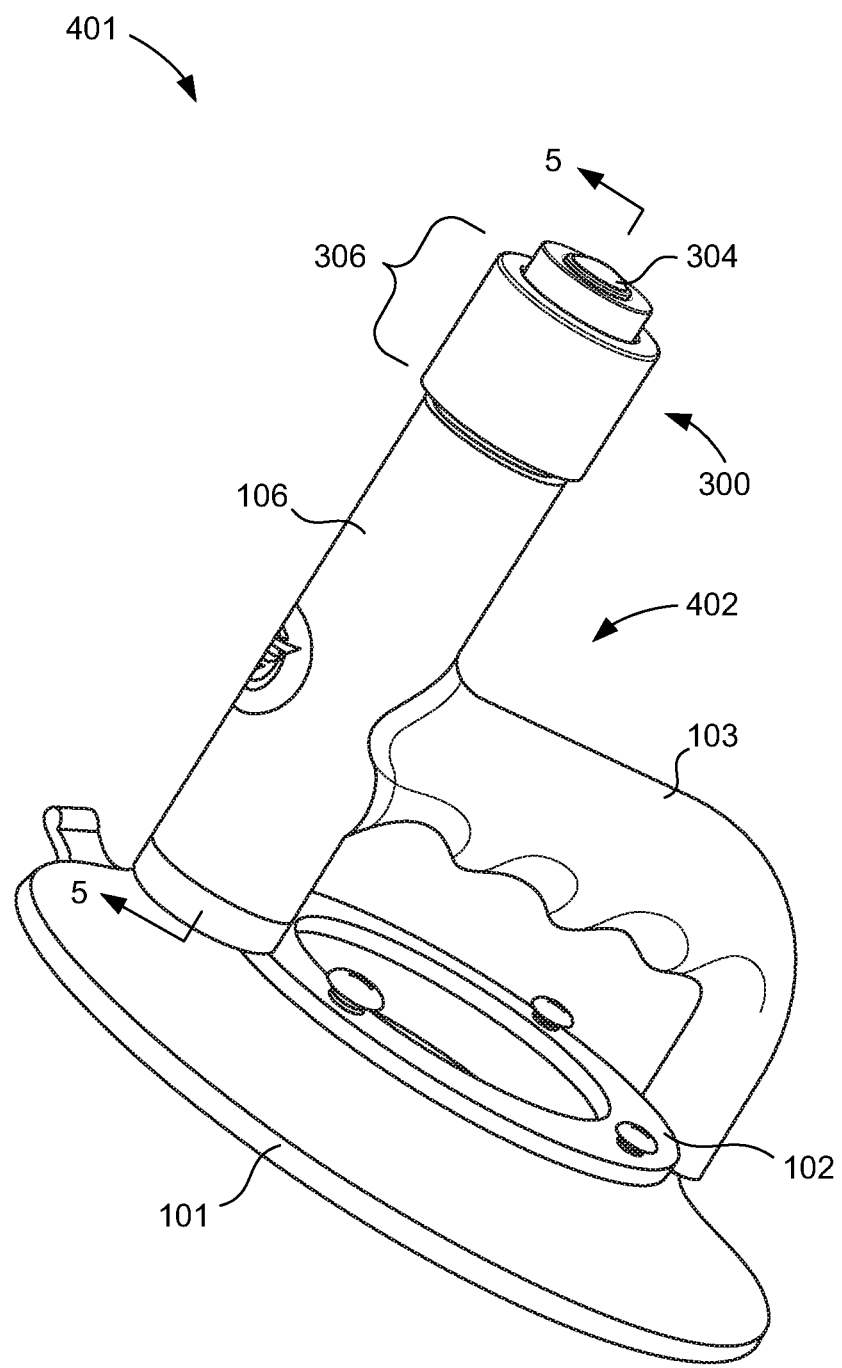
FIG. 4 is an isometric view of a powered vacuum cup device according to an embodiment of the present invention.

A powered vacuum cup device 401 according to an embodiment of the present invention shown in FIG. 4 includes a device body 402 defining the pump cylinder 106 for a manually operated vacuum pump. Device body 402 also includes a base 102 and a handle 103 in the example of FIG. 4. In addition to the device body 402, vacuum cup device includes a powered pump unit 300 as shown in FIG. 3, having pump unit housing 302, a power source receiver 600, a vacuum pump 604, a pump drive 602, and a sealing arrangement 307 as described above in connection with FIGS. 3 and 6 and as described elsewhere herein.

The sealing arrangement 307 for powered pump unit 300 may comprise any suitable peripheral sealing device located or mounted on an external surface of the pump unit housing 302. Such a sealing element may include an O-ring 308 for example held in a suitable O-ring groove of the pump unit housing 302. It is also possible that the pump unit housing 302 could be configured with a peripheral area of very close tolerance to the cylinder 106 sufficient to provide an effective seal.

Figure 5:
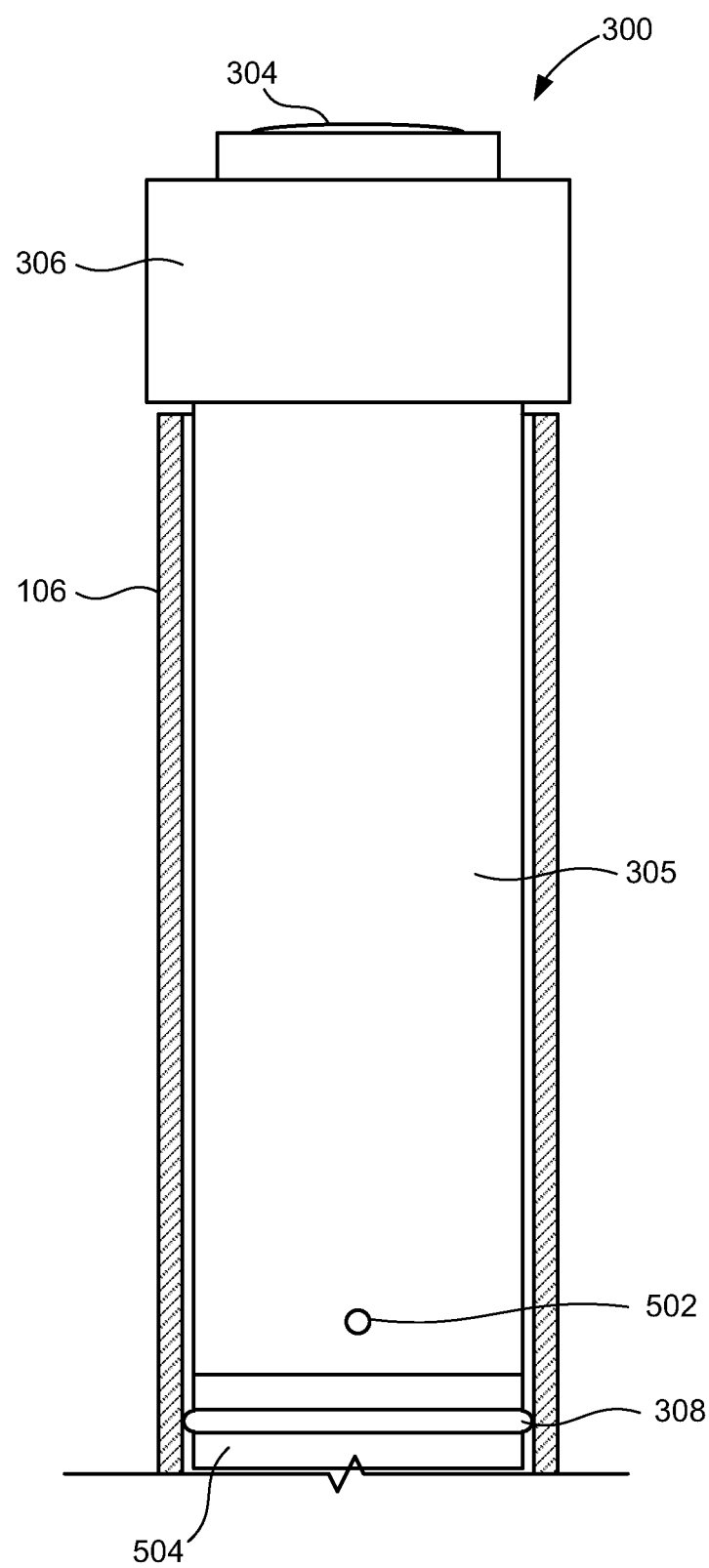
FIG. 5 is a partial section view along line 5-5 in FIG. 4 showing the pump cylinder with the powered pump unit of FIG. 3 inserted to an operating position.

Referring particularly to FIGS. 3 and 5, the pump unit housing 302 may include an insertion component 305 and an extension component 306. The insertion component 305 is adapted to reside within the pump cylinder 106 when the pump unit housing 302 is in the operating position while the extension component 306 is adapted to extend outside of the pump cylinder 106 when the pump unit housing 302 is in the operating position. Such an operating position is shown for example in FIGS. 4 and 5. It should be appreciated that although the figures show insertion component 305 in FIG. 5 extending well in to the pump cylinder 106 (essentially to the bottom of the cylinder 106 adjacent to the vacuum cup 101 shown in FIG. 1), it is within the scope of the present invention that the insertion component 305 may not extend sufficiently so that the sealing arrangement 307 forms a seal in the part of the prior art structure where the prior art manually operated piston was intended to reciprocate. Rather, the insertion component of pump unit housing 302 may extend only into the upper part of pump cylinder 106 that, in the illustrated example, provides a housing for the plunger carrier portion of a prior art piston/plunger assembly (plunger carrier 202 in FIG. 2). In this case the seal produced according to the invention may be made in the upper part of cylinder 106 which essentially comprises a plunger housing that, in the illustration of FIG. 5, is a continuation of the pump cylinder 106. As noted above, the plunger housing may be considered part of the prior art pump cylinder as the designation "pump cylinder" is used in this disclosure and the accompanying claims.

It should be noted from FIGS. 5 and 6 that when the pump unit housing 302 is received in the illustrated operating position in the pump cylinder 106, components of the powered pump unit 300 may reside in the volume defined by the pump cylinder 106. Although such an arrangement is convenient to produce a more compact powered vacuum cup from a prior art manually operated vacuum cup device, other implementations of the invention may include one or more of the pump drive 602, vacuum pump 604, and battery arrangement 601 located outside of the pump cylinder 106 when the pump unit housing 302 is received in the operating position within the pump cylinder 106. Implementations of a powered pump unit according to the present invention preferably position at least one of the vacuum pump 604, pump drive 602, and power source receiver 600 at least partially located/received in the prior art pump cylinder when the pump unit housing is received in the operating position within the pump cylinder.

The example powered pump unit 300 includes an electrical switch mounted on the extension component 306 of the pump unit housing 302. The electrical switch 303 (see FIGS. 11 and 12) may be activated through a switch button 304 and includes a switch position which closes a circuit to the pump drive 602 when the power source such as a battery arrangement 601 is operatively received in the power source receiver 600.

In the illustrated example powered pump unit 300, the insertion component 305 may comprise a cylindrical housing. As shown perhaps best in FIG. 6, a closure element 504 may be mounted at an end of the insertion component 305 opposite to the extension component 306 and the sealing arrangement 307 may include the O-ring 308 mounted on the closure element 504. In the example powered pump unit 300, closure element 504 is secured through a set screw 802 shown best in the exploded views of FIGS. 8 and 10 together with cooperating threaded openings 803 and 804 in the insertion component 305 and closure element 504, respectively. The vacuum pump 604 may be spaced apart from the closure element 504 to form and exhaust space 610 within the pump unit housing 302. In such an arrangement the vacuum port 605 may be open to the first portion of the pump cylinder 106 through a spacer tube 606 extending from the vacuum pump 604 and through an opening 607 in the closure element 504 aligned with the spacer tube 606. Also, the example vacuum pump 604 shown in FIGS. 6, 8, and 10 includes a peripheral seal 612 acting between vacuum pump 604 and the inner surface of pump unit housing 302 to seal off the exhaust space 610 from the remainder of the pump unit housing 302. One or more housing exhaust ports 502 may be provided in the pump unit housing 302 to allow a discharge from vacuum pump 604 to escape the exhaust area 610.

A powered pump unit 300 and 300A in accordance with the present invention may be used with substantially any prior art vacuum cup device having a pump cylinder for a manually operated vacuum pump. Although all of the illustrated example prior art vacuum cup devices (100 and 100A) have a pump cylinder extending essentially perpendicular to the plane formed by the vacuum cup outer edge, the invention is not limited to such prior art devices. Rather, the pump cylinder of the manually operated vacuum cup device may be oriented at any angle to the plane formed by the vacuum cup outer edge. For example, the pump cylinder of the manually operated vacuum cup device may be oriented perpendicular to the pump cylinder orientation shown in the illustrated examples.

The illustrated powered pump unit 300 is secured in the operating position in cylinder 106 by the friction of the contact between sealing arrangement 307 and the wall defining the cylinder. No further securing element or connecter may be necessary. However, this friction preferably still allows the powered pump unit 300 to be manually pumped as shown in FIGS. 17-22 to pull a vacuum on the associated vacuum cup through a one-way valve (not shown) in a fluid path between the cylinder 106 and vacuum cup volume, that is, the volume under the vacuum cup. In this manual operation, which may be helpful if the power source/battery 601 becomes depleted, includes moving the powered pump unit 300A from the fully inserted position shown in FIG. 17 as shown in FIGS. 18 and 19. This movement draws a vacuum in the volume of the cylinder 106 below the closure element 504 (FIGS. 5 and 6). From the position in FIG. 19, a return stroke shown in FIGS. 20-22 returns the powered pump unit 300A to the fully inserted position for another vacuum stroke as in FIGS. 18 and 19 if needed.

As used herein, whether in the above description or the following claims, the terms "comprising," "including," "carrying," "having," "containing," "involving," and the like are to be understood to be open-ended, that is, to mean including but not limited to. Also, the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above-described preferred embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

The invention claimed is:

1. A powered pump unit for a vacuum cup device having a pump cylinder for a manually operated vacuum pump, the pump cylinder adapted to removably receive a manually operated piston which is removeable to expose the pump cylinder, the powered pump unit including:
   (a) a pump unit housing adapted to be at least partially received in the pump cylinder in an operating position after the piston is removed from the pump cylinder;
   (b) a power source receiver mounted on the pump unit housing;
   (c) a vacuum pump mounted on the pump unit housing, the vacuum pump having a vacuum port and a discharge port, the vacuum port being open to a first portion of the pump cylinder when the pump unit housing is in the operating position, the first portion of the pump cylinder being in fluid communication with a cup volume of the vacuum cup device;
   (d) a pump drive mounted on the pump unit housing, the pump drive being operatively connected to drive the vacuum pump to produce a vacuum at the vacuum port in response to power applied through a power source when the power source is operatively received in the power source receiver;
   (e) a sealing arrangement adapted to form a seal with the pump cylinder when the pump unit housing is in the operating position, the seal serving to isolate the first portion of the pump cylinder from a remainder of the pump cylinder; and
   (f) wherein at least one of the power source receiver, the vacuum pump, and pump drive is received at least partially located in the pump cylinder when the pump unit housing is in the operating position.

2. The powered pump unit of claim 1 further including the power source operatively received in the power source receiver, the power source comprising a battery arrangement.

3. The powered pump unit of claim 2 wherein the battery arrangement includes a rechargeable battery and wherein the powered pump unit includes a battery charging circuit having a battery charging port.

4. The powered pump unit of claim 1 wherein the sealing arrangement includes a peripheral sealing element mounted on an external surface of the pump unit housing.

5. The powered pump unit of claim 1 wherein:
(a) the pump unit housing includes an insertion component adapted to reside at least partially within the pump cylinder when the pump unit housing is in the operating position; and
(b) the pump unit housing includes an extension component adapted to extend outside of the pump cylinder when the pump unit housing is in the operating position.

6. The powered pump unit of claim 5 wherein at the power source receiver, the vacuum pump, and pump drive are located in the pump cylinder when the pump unit housing is in the operating position.

7. The powered pump unit of claim 5 wherein the insertion component comprises a cylindrical housing.

8. The powered pump unit of claim 7 wherein the insertion component includes a closure element at an end opposite to the extension component and wherein the sealing arrangement includes an O-ring mounted on the closure element.

9. The powered pump unit of claim 8 wherein the vacuum pump is spaced apart from the closure element to form and exhaust space and the vacuum port is open to the first portion of the pump cylinder through a spacer tube extending from the vacuum pump and through an opening in the closure element and aligned with the spacer tube.

10. A powered vacuum cup device including:
(a) a device body defining a pump cylinder for a manually operated vacuum pump;
(b) a pump unit housing at least partially received in the pump cylinder in an operating position;
(c) a power source receiver mounted on the pump unit housing;
(d) a vacuum pump mounted on the pump unit housing, the vacuum pump having a vacuum port and a discharge port, the vacuum port being open to a first portion of the pump cylinder when the pump unit housing is in the operating position, the first portion of the pump cylinder being in fluid communication with a cup volume of a vacuum cup connected to the device body;
(e) a pump drive mounted on the pump unit housing, the pump drive being operatively connected to drive the vacuum pump to produce a vacuum at the vacuum port in response to power applied through a power source when the power source is operatively received in the power source receiver;
(f) a sealing arrangement adapted to form a seal with the pump cylinder when the pump unit housing is in the operating position, the seal serving to isolate the first portion of the pump cylinder from a remainder of the pump cylinder; and
(g) wherein at least one of the power source receiver, the vacuum pump, and pump drive is received at least partially located in the pump cylinder when the pump unit housing is in the operating position.

11. The powered vacuum cup device of claim 10 further including the power source operatively received in the power source receiver, the power source comprising a battery arrangement.

12. The powered vacuum cup device of claim 11 wherein the battery arrangement includes a rechargeable battery and wherein the powered vacuum cup device includes a battery charging circuit having a battery charging port.

13. The powered vacuum cup device of claim 10 wherein the sealing arrangement includes a peripheral sealing element mounted on an external surface of the pump unit housing.

14. The powered vacuum cup device of claim 10 wherein:
(a) the pump unit housing includes an insertion component adapted to reside within the pump cylinder when the pump unit housing is in the operating position; and
(b) the pump unit housing includes an extension component adapted to extend outside of the pump cylinder when the pump unit housing is in the operating position.

15. The powered vacuum cup device of claim 14 wherein at the power source receiver, the vacuum pump, and pump drive are located in the pump cylinder when the pump unit housing is in the operating position.

16. The powered vacuum cup device of claim 14 wherein the insertion component comprises a cylindrical housing.

17. The powered vacuum cup device of claim 16 wherein the insertion component includes a closure element at an end opposite to the extension component and wherein the sealing arrangement includes an O-ring mounted on the closure element.

18. The powered vacuum cup device of claim 17 wherein the vacuum pump is spaced apart from the closure element to form and exhaust space and the vacuum port is open to the first portion of the pump cylinder through a spacer tube extending from the vacuum pump and through an opening in the closure element and aligned with the spacer tube.

19. A method of applying a vacuum to a vacuum cup of a vacuum cup devices, the vacuum cup device having a pump cylinder for a manually operated vacuum pump, the pump cylinder adapted to removably receive a manually operated piston which is removeable to expose the pump cylinder, the method including:
(a) with the manually operated piston removed from the pump cylinder, inserting a pump unit housing at least partially into the pump cylinder to an operating position for the pump unit, wherein,
  (i) a power source is mounted on the pump unit housing,
  (ii) a vacuum pump is mounted on the pump unit housing, the vacuum pump having a vacuum port and a discharge port, the vacuum port being open to a first portion of the pump cylinder when the pump unit housing is in the operating position, the first portion of the pump cylinder being in fluid communication with a cup volume of the vacuum cup device,
  (iii) a pump drive is mounted on the pump unit housing, the pump drive being operatively connected to drive the vacuum pump to produce a vacuum at the vacuum port in response to power from the power source,
  (iv) a sealing arrangement for the pump housing is adapted to form a seal with the pump cylinder when the pump unit housing is in the operating position, the seal serving to isolate the first portion of the pump cylinder from a remainder of the pump cylinder, and
  (v) at least one of the power source, the vacuum pump, and pump drive is received at least partially located in the pump cylinder when the pump unit housing is in the operating position; and (b) operating the pump drive to drive the vacuum pump to produce a vacuum at the vacuum port which is applied to the cup volume of the vacuum cup from the pump cylinder.

20. The method of claim 19 wherein the pump housing includes an insertion component comprising a cylindrical housing which is received in the pump cylinder when the pump housing is in the operating position and wherein the pump drive is located within the cylindrical housing.

* * * * *